United States Patent [19]

Baur et al.

[11] Patent Number: 4,916,285
[45] Date of Patent: Apr. 10, 1990

[54] CAPACITOR FOIL OF ALUMINUM OR AN ALUMINUM ALLOY

[75] Inventors: Rudolf Baur; Markus Kern, both of Kreuzlingen, Switzerland

[73] Assignee: Swiss Aluminium Ltd., Chippis, Switzerland

[21] Appl. No.: 319,975

[22] Filed: Mar. 6, 1989

Related U.S. Application Data

[63] Continuation-in-part of Ser. No. 128,332, Dec. 2, 1987, abandoned, which is a continuation-in-part of Ser. No. 856,407, Apr. 28, 1986, abandoned.

[51] Int. Cl.$^4$ .............................................. B23K 26/12
[52] U.S. Cl. ........................... 219/121.72; 219/121.84
[58] Field of Search ............... 428/606; 219/121 LG, 219/121 LN, 121 FS, 121.67, 121.69, 121.72, 121.84

[56] References Cited

U.S. PATENT DOCUMENTS

| | | | |
|---|---|---|---|
| 2,755,237 | 7/1956 | Turner | 428/606 |
| 3,316,164 | 4/1967 | Welch | 428/606 |
| 3,360,398 | 12/1967 | Garibotti | 219/121 FS |
| 3,597,579 | 8/1971 | Lumley | 219/121 LJ |
| 3,604,890 | 9/1971 | Mullaney | 219/121 LG |
| 3,666,642 | 5/1972 | Alwan et al. | 428/606 |
| 3,786,224 | 1/1974 | Heywang et al. | 29/620 |
| 3,905,096 | 9/1975 | Tawara et al. | 219/121 LN |
| 3,939,440 | 2/1976 | Berg et al. | 29/605 |
| 4,229,865 | 10/1980 | Fanning | 219/121 LG |
| 4,238,661 | 12/1980 | Braunlich | 219/121 LN |
| 4,240,127 | 12/1980 | Fanning et al. | 219/121 LG |
| 4,689,466 | 8/1987 | Hoshinouchi et al. | 219/121.84 |
| 4,724,297 | 2/1988 | Nielsen | 219/121.84 |

FOREIGN PATENT DOCUMENTS

| | | | |
|---|---|---|---|
| 2743544 | 3/1979 | Fed. Rep. of Germany | 219/121 LG |
| 3405406 | 8/1985 | Fed. Rep. of Germany | 219/121 LG |
| 73491 | 6/1980 | Japan | 219/121 LG |
| 16094 | 4/1985 | Japan | 219/121 LN |

OTHER PUBLICATIONS

De Silva et al., "The Fabrication of Foil Masks Using Laser Cutting", Thin Solid Films, 77 (1981), pp. 341–346.

Primary Examiner—John J. Zimmerman
Attorney, Agent, or Firm—Bachman & LaPointe

[57] ABSTRACT

A capacitor foil made of aluminum or an aluminum alloy whose edge has been treated using a LASER beam exhibits practically no burrs or cracks, as a result of which an increase in the nominal field strength of capacitors made with such a foil becomes possible. A further increase in the nominal field strength is achieved by creating at least one edge with a LASER beam which is enclosed in a reactive gas or gas mixture having a concentration of oxygen greater than the concentration of oxygen in air.

8 Claims, 5 Drawing Sheets

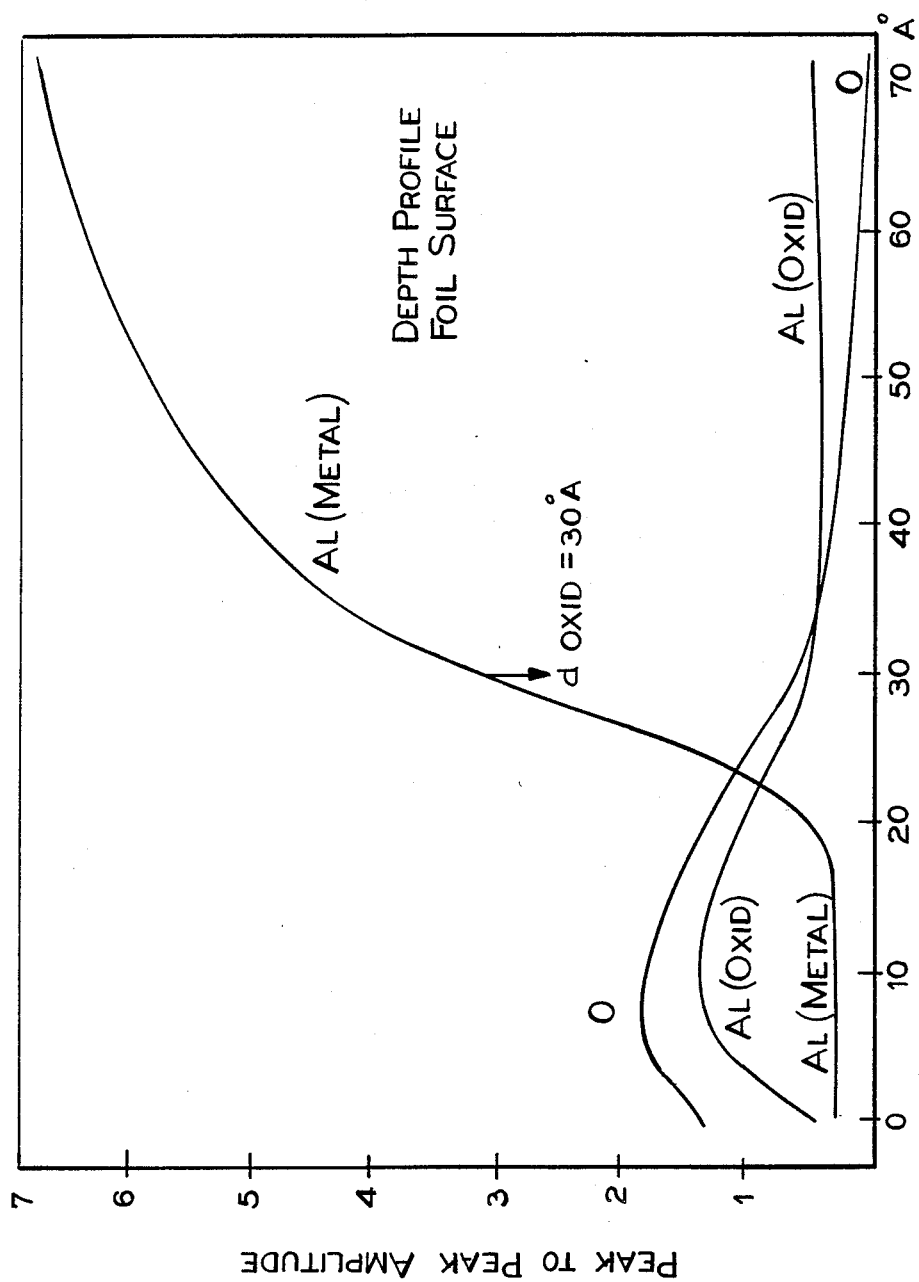

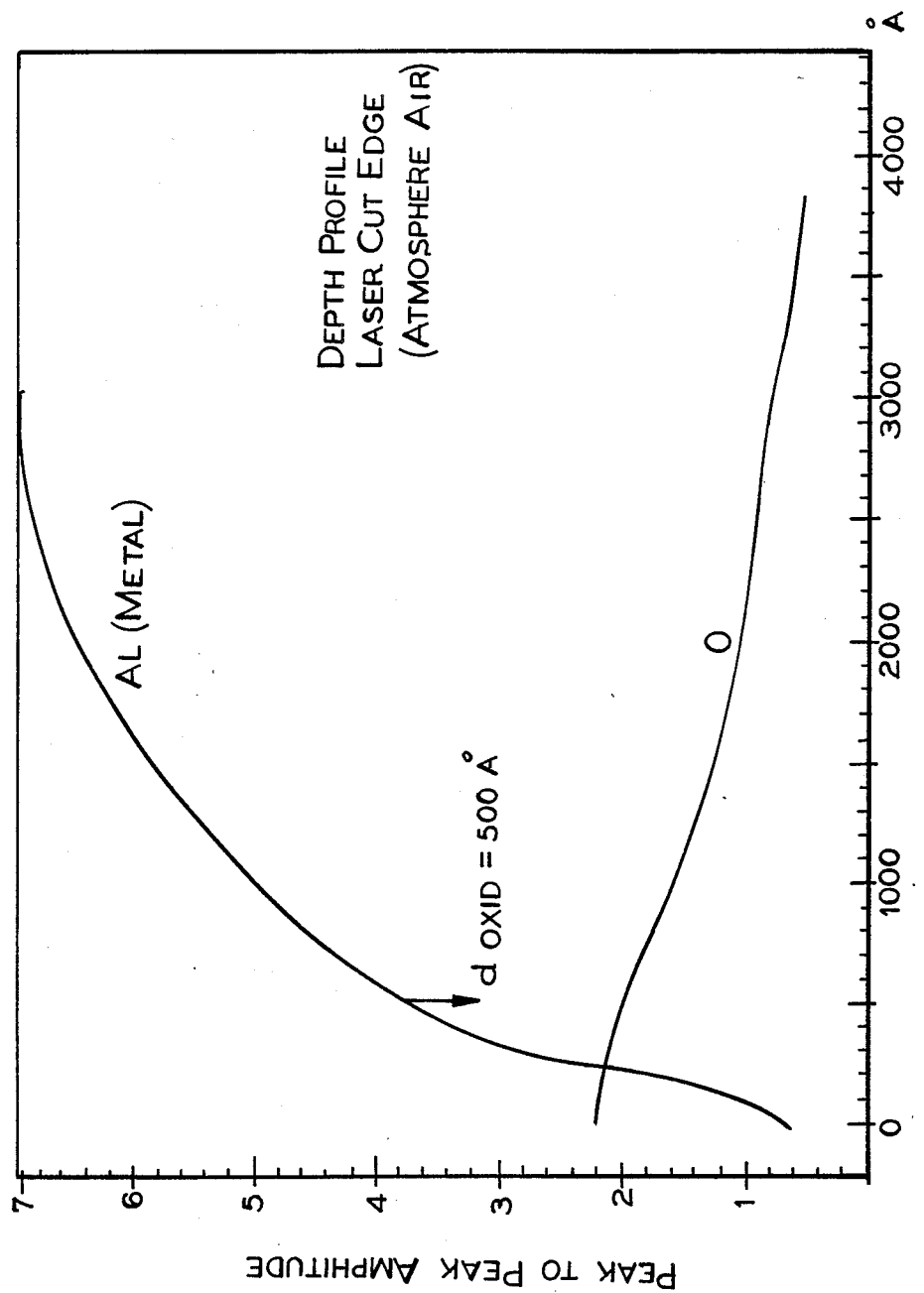

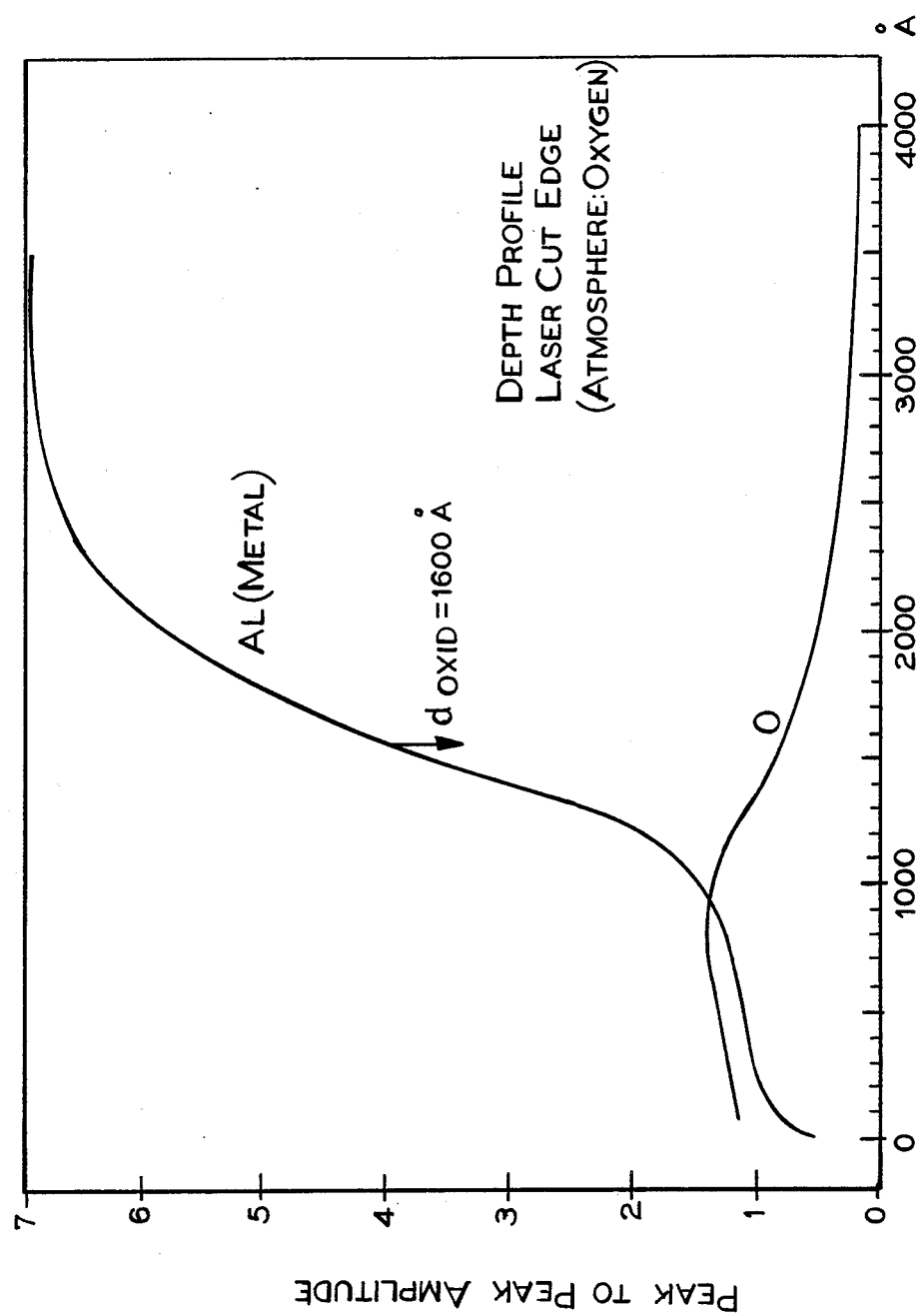

CAPACITOR FOIL OF ALUMINUM OR AN ALUMINUM ALLOY

CROSS REFERENCE TO RELATED APPLICATION

This application is a Continuation-In-Part of U.S. patent application Ser. No. 128,332, filed Dec. 2, 1987 now abandoned, which is in turn a Continuation-In-Part of U.S. patent application Ser. No. 856,407, filed Apr. 28, 1986 now abandoned.

BACKGROUND OF THE INVENTION

The present invention relates to a capacitor foil of aluminum or an aluminum alloy having edges created by a LASER beam.

Capacitors for energy storage purposes normally comprise a plurality of windings 10 which, depending on the application, are connected either in series or in parallel. FIG. 1 represents a schemetical cut through a winding. Voltage is applied between the two electrodes E1 and E2. A dielectric material 12 separates the two electrodes and defines together with an insulating fluid the dielectric behavior of the capacitor. Generally, the insulating fluid impregnates and surrounds the whole capacitor winding.

In the past, capacitors were produced with paper as the dielectric material. As reported in the paper "On The Characteristics of Aluminum Oxide-Loaded Capacitor Paper" by M. Tuuri et al., CIGRE Session 1962, Report No. 110, Dec. 17, 1962, investigations have been carried out into the effect of aluminum oxide added to capacitor paper. These investigations have shown that the power factor, the insulation resistance, and the life of the aluminum oxide-loaded paper were better than those of paper without aluminum oxide. No noteworthy differences were found in the dielectric constant and breakdown voltage. The tests also indicated that the change in the power factor of aluminum oxide-loaded paper under stress was less severe than the corresponding change in paper with no aluminum oxide.

In a typical, modern capacitor dielectric of All-Film technology, the dielectric comprises one or more layers, typically two, of plastic foil and a saturation or impregnation fluid. Paper, whether embedded with aluminum oxide or not, is no longer employed. These modern capacitors have an average field strength (effective value) of 50 V/$\mu$m. At the edges of the foil forming the windings, there is theoretically a high field strength of unlimited magnitude, although actual field strength at the edges can neither be calculated nor measured.

A pure aluminum foil such as double rolled pure aluminum foil is generally used as an electrode for alternating-current capacitors in which the winding effective voltage lies above 600 V. At winding voltages under this value, an aluminum or zinc layer evaporated on the plastic film dielectric or a layer of a mixture of these two metal functions is used as the electrode unless special requirements are made of the capacitor. Special requirements are for example good capacitance stability, large temperature range and long life.

Field calculations show that the field strength increase at the electrode edges is smallest when all the electrode edges are exactly one above the other. Winding of electrode edges exactly one above the other is a condition which usually cannot be fulfilled in production. This is due to various causes such as, for example, the width tolerance of the electrodes, typically larger than 0.2 mm, and the mechanical stresses in the plastic films used for the dielectric media. The stresses present in the plastic films often cause the films and hence the electrodes to be offset laterally during the winding process. With a typical dielectric thickness of 16 to 30 $\mu$m, the edges would have to be wound exactly above one another in an area of only a few $\mu$m to be able to speak of edges over one another. If the electrodes, which are at a different potential, are laterally offset only by even the amount of thickness of the dielectric, this results in an increase of the field strength at the inner edge which almost corresponds to the final value of the field strength which occurs with a large offset.

Using the above knowledge, electrodes have been dimensioned and wound in such a way, that they protrude from the winding on one side, each one opposite the other. This generally does not result in additional weak points. This production method facilitates contact-making and also has advantages for the overall behavior of the capacitor. In comparison with traditional contact-making by means of contact tags, this results for example in a reduction of the connection inductivity. The locally occurring, maximum current density is also lower. In addition there are no contact tags that could cause local damage to the dielectric.

In order to utilize the dielectric better, the inner electrode edge can be folded over. If the beginning and the end of the electrode are also folded over, then there are no sharp edges either in the inside or at the edge of the dielectric. The improvement in the dielectric properties of a capacitor produced in this manner is remarkable. An undesired effect is, however, the thickening of the winding caused by the folding over. In order to be able to impregnate such windings correctly with an insulating oil, the winding must be relatively loose. This has a negative effect on the stability both of the winding and the winding stack.

It is believed that if the inner edge can be rounded off without causing a local thickening of the electrode which hinders the impregnation of the winding, then further improvements in the dielectric behavior of the capacitors, as compared to capacitors with folded-over electrode edges, can be expected. One method of producing rounded-off electrode edges consists of cutting the capacitor foil by means of a LASER. Such a capacitor foil is already known through Japanese Patent Application 55-030813.

By cutting with a LASER beam, the cut edge of the metal foil is rounded with the result that there is a significant diminution in the burrs and cracks typically formed at the edge of the metal foil when cutting with mechanical cutting tools, in particular circular tools for that purpose. Such burrs and cracks lower the maximum nominal voltages available from capacitors using such foils because of the local increase in field strength at these sites. The increase in field strength places a heavy local demand on the dielectric medium which leads to premature failure of the capacitor and which renders it impossible to make optimum use of the capacitor dielectric.

Since aluminum surfaces strongly reflect LASER light, it is not possible to separate aluminum foil in one continuous cut. The LASER used must be run in an intermitting mode to supply the energy density required for melting. This results in a sawtooth-like formation of the cut edge. Although each one of these "teeth" is rounded off, without special measures the irregular formation of the edge does not lead to the required improvement of the dielectric behavior of a capacitor made with a foil of this kind.

The thermal nature of the LASER process creates in its area of influence not only a rounded off cut edge, but also leads to the formation of an oxide layer on the edge and in its immediate vicinity. Hitherto this oxide layer has not been taken into account in the observation of the properties of a power capacitor for alternating current. As will be seen from the following discussion, it can, however, play an important role in the overall system even though the formation of the oxide layer is difficult to control.

SUMMARY OF THE INVENTION

Although the high quality of dielectrics available today make it possible to manufacture capacitor units with very high nominal field strengths, efforts are still being made to increase the nominal field strengths further by means of further measures applied to the capacitor materials. Accordingly, it is an object of the present invention to provide a capacitor foil made of aluminum or an aluminum alloy having a rounded edge which enables an additional increase in the nominal field strength to be attained in capacitors. This is in particular to be achieved by reducing the imbalance of the field strength at the edge region of the foil in order to avoid local electrical overloading of the dielectric.

It is a further object of the present invention to provide a process for forming such capacitor foil.

In accordance with the present invention, the foregoing objects are achieved by a capacitor foil of aluminum or an aluminum alloy having at least one rounded edge which has been created by a LASER beam enclosed in a reactive gas or gas mixture. As used herein, the term "enclosed" signifies that the air in the immediate vicinity of the LASER beam is displaced by the reactive gas so that the LASER beam is enveloped in the reactive gas and this gas is in effective contact with the foil during the creation of the cut edge. Particularly advantageous versions of the foil according to the present invention may be formed by creating the at least one edge by a LASER beam enclosed in a gas containing a higher concentration of oxygen than the concentration of oxygen in air such as a LASER beam enclosed in pure oxygen.

These and other objects and advantages will become more apparent from the following description and drawings in which like reference numerals depict like elements.

BRIEF DESCRIPTION OF THE DRAWINGS

FIGS. 5-7 show the depth profile (peak height of Aluminum (oxide), Aluminum (metal) and Oxygen (O)) as a function of the approximate depth of ion etching.

DETAILED DESCRIPTION OF THE INVENTION

The present invention relates to capacitor foil of aluminum or an aluminum alloy having at least one rounded edge created by at least one LASER beam. As previously discussed, a LASER beam creating an edge on an aluminum or aluminum alloy foil forms an aluminum oxide layer on and in the immediate vicinity of the edge. The present invention takes advantage of the knowledge that the aluminum oxide in such a layer has the property of adsorbing free ions and thus bonding them.

Free ions are regarded as damaging in capacitor dielectrics of alternating-current capacitors as they are accelerated by the alternating electric field. This leads to an undesired heating of the dielectric. If an oxide layer is formed on an electrode edge in such a manner that its ability to bond ions is maximized, then at the same time as the foil is cut, a filter is created capable of removing free ions from an impregnating agent. Moreover, these ions are adsorbed by the oxide layer exactly where the field strength is the greatest. It is therefore exactly at these critical points that the field strength is reduced. Overall this leads to a significant improvement in the behavior of the dielectric, a behavior close to that of power capacitors produced with a folded-over electrode.

This improvement is obtained by the present invention through careful control of the composition of the gases surrounding the aluminum or aluminum alloy capacitor foil as it is cut by a LASER beam. Through control of the reactivity of the gas, reactivity in the sense of the reaction of aluminum with oxygen, in the environment of the zone influenced by the LASER, the oxide layer thickness can be influenced to improve its ability to adsorb and bind free ions. Another advantage of the present invention is that this improvement can be obtained without causing the thermally influenced edge to break off due to excessive hardening.

It has also been found that by using a LASER beam in accordance with the present invention, the rounded edge exhibits substantially no burrs or cracks. As a result of this, the imbalance of field strength at the edge region of the foil can be reduced and an increase in the nominal field strength of capacitors made with the foil can be obtained.

Figure 1:
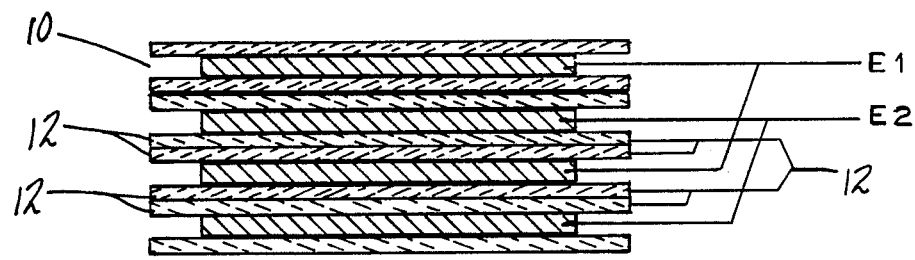
FIG. 1 is a cross sectional view of a portion of capacitor winding.
Figure 2:
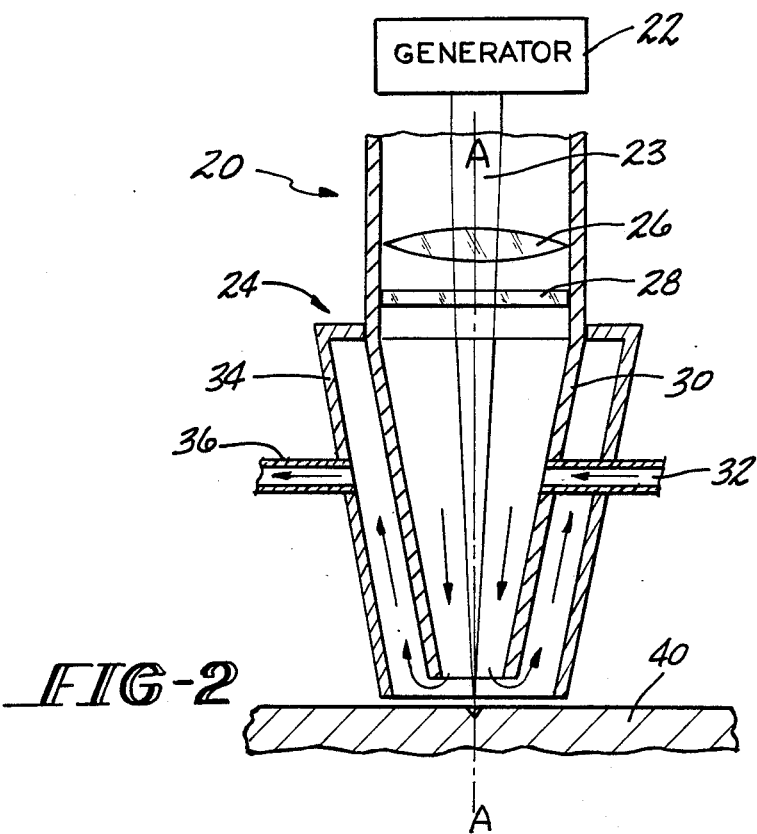
FIG. 2 is a cross sectional view of a LASER for forming capacitor foil having at least one rounded edge.

To form the capacitor foil of the present invention, foil formed from aluminum or an aluminum alloy is cut to a desired width, usually substantially the width of the dielectric medium, using one or more LASER beams. Although the LASER beam(s) may be created using any suitable LASER generator(s) known in the art, a LASER device such as the one shown in FIG. 2 can provide the desired results and effects.

The LASER device 20 comprises a LASER beam generator 22 such as pulsed Nd-YaG laser generator for generating a single beam 23 and a LASER head 24 with a focussing lens 26 and a lens protector 28. The LASER head 24 has an inner flow nozzle 30 communicating with a gas inlet 32 and an outer concentric nozzle portion 34 with a gas outlet 36. The LASER head 24 is designed in this manner to enclose the cutting LASER beam in a controlled atmosphere.

For reasons which will become more clearer hereinafter, the gas inlet 32 communicates with a source not shown of a reactive gas or a gas mixture containing a concentration of oxygen higher than the concentration of oxygen in air. The gas inlet, for example, may communicate with a pure oxygen source.

Figure 3:
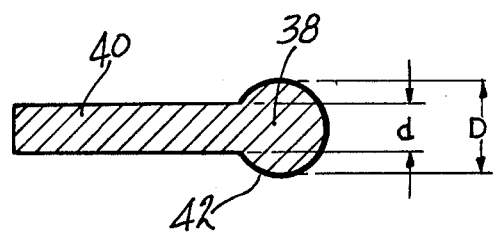
FIG. 3 is a cross sectional view of a portion of a capacitor foil with a rounded edge.
Figure 4:
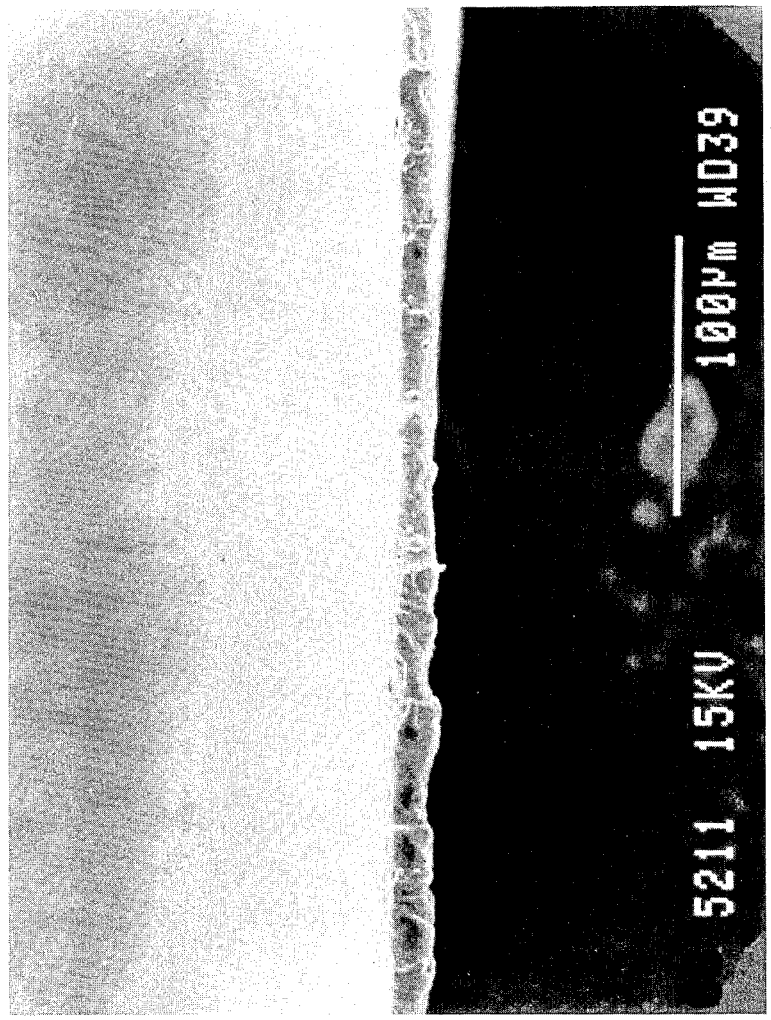
FIG. 4 is a photomicrograph of a LASER slit aluminum foil edge at a magnification of 300×.

A rounded edge 38 such as that shown in FIGS. 3 and 4 may be created by placing the LASER head 24 in close proximity to a surface 38 of the foil 40 and cutting the foil with the LASER beam while moving the foil 40 relative to the LASER head. In the system shown in FIG. 2, the aluminum foil 40 moves perpendicular to the axis A—A of the LASER beam in the plane of the paper.

By enclosing the LASER beam in a reactive gas or gas mixture, air in the vicinity of the LASER beam is displaced by the reactive gas or gas mixture so that the LASER beam is enveloped in the reactive gas or gas mixture and the reactive gas or gas mixture is in effective contact with the foil during creation of the edge. One advantage to forming the rounded edge in this manner is that a much thicker oxide layer 42 is produced at the cut edge region of the foil than would ordinarily be formed. As a result, more free ions at the edge region can accumulate on the thicker oxide layer and be bound, rendering them harmless. Thus, where insulating oil is used during formation of the capacitor, it is purified by the removal of free ions which drift to the oxide layer where the largest field strength prevails and are chemisorbed therein. These bonded ions lead to a reduction of the field strength in this critical zone which increases the service life of the dielectric and the whole capacitor.

FIGS. 5–7 show an analysis of the following materials:

Foil (normal surface in as-supplied condition);
Foil edge, cut using conventional circular knife;
Foil edge, cut in air using laser beam; and
Foil edge, cut in oxygen using laser beam.

The figures show the depth profile (peak height of Al, metal, and oxygen O) as a function of the approximate depth of ion etching. The analysis was performed using an Auger Electron spectrometer.

In Auger spectroscopy, the generally weak intensities of Auger electron transitions are usually present in the form of the first derivative which is approximately the peak to peak amplitude of the element being investigated. This peak to peak amplitude is roughly proportional to the atomic concentration of the element being investigated. Oxide film thickness on the foil surface and the laser cut edge is determined by depth profiling the concentration of oxygen, aluminum (oxide) and aluminum (metal) using ion etching (argon positive ions) techniques. During depth profiling through the oxide-metal interface the oxygen and aluminum oxide signal will decrease while the signal of the underlying aluminum metal will increase. As a measure of oxide thickness, the point of inflection of the aluminum (metal) signal is chosen.

FIG. 5 represents the normal depth profile of a foil surface. Detectable are the elements Oxygen (O), Aluminum (oxide), Aluminum (metal) and Carbon (C) not shown. On reaching the oxide/metal interface, the height of the Aluminum (metal) peak increased while the amplitudes of the Aluminum (oxide) peak and oxygen fell. The thickness of the oxide layer was determined to be approximately 30Å.

One edge of the foil surface was cut in air using a conventional circular knife and analyzed. The depth profile on this edge wa practically the same as before. Only the fraction of carbon (not shown) here was, as expected, much higher through the whole oxide layer was the case with the normal foil surface.

FIG. 6 shows the depth profile of a foil edge cut using a laser beam enclosed in air. The foil edge exhibited a much greater thickness of oxide layer estimated at about 500Å. The relatively flat increase in the Aluminum (metal) signal points to an oxide layer that was not very homogeneous. The carbon concentration (not shown) was low.

FIG. 7 shows the depth profile of a foil edge cut using a laser beam enclosed in a pure oxygen atmosphere. The cut edge had a well defined depth profile. The oxide layer was significantly thicker, i.e. about 1600Å thick. The carbon content was slightly higher than with the edge cut by the laser beam in air.

Table I reports the various types of cut foil analyzed and the thickness of the oxide layer found at the cut edge.

The influence of oxygen on the formation of the desired oxide layer is clear. From the electrical point of view the thickest oxide layer would give the best behavior. As the oxide layer is very brittle its maximum thickness is limited in practice to less than 1600Å. In a preferred manner of performing the present invention, the reactive gas should contain from about 45 to 60% oxygen so as to form an oxide layer having a minimum thickness of from about 800 to 1200Å.

TABLE I

| Type of foil | Oxide layer thickness |
| --- | --- |
| Foil not subjected to thermal influence | approx. 30Å |
| Foil laser cut in atmospheric air | approx. 500Å |
| Foil laser cut in oxygen rich atmosphere | approx. 1600Å |

The duration of the action of the LASER beam on the aluminum foil is typically less than 2 μsec (0.000002 sec.). The action of the LASER beam is normally limited to a circular region of influence having a diameter of about 50 μm. The rounded edge which is formed generally has a diameter D from about 1.6 to 2 times the foil thickness d. Additionally, the foil with the substantially smooth rounded edge nears a maximum field strength value which is approximately ten times the average field strength.

As previously discussed, capacitors typically comprise at least two metal layers which act as electrodes separated by a layer of dielectric material such as a plastic film and/or capacitor paper. The capacitor foil of the present invention may be used to form a wide variety of capacitors using a wide variety of techniques known in the art. It particularly lends itself to those techniques which involve winding alternating strips of metal foil and dielectric material on a mandrel and impregnating the winding with an insulating oil.

Capacitors prepared with electrodes formed by the foil of the present invention achieve practically the same dielectric strength as capacitors made using the method of folding over the electrode made using the method of folding over the electrode edges but without the disadvantage of building up a greater thickness at those places where the electrodes are twice as thick due to the folding. As previously discussed, the folded over portions of the electrodes make the impregnation process more difficult as well as hinder the manufacture of compact mechanically stable windings.

It is apparent that there has been provided in accordance with this invention capacitor foil of aluminum or an aluminum alloy which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Process for forming a capacitor foil of aluminum alloy which comprises creating at least one rounded edge exhibiting substantially no burrs and cracks on said aluminum or aluminum alloy foil with a LASER beam enclosed in a reactive gas wherein said reactive gas is a gas mixture containing from about 45% to about 60% oxygen so that air in the immediate vicinity of the LASER beam is displaced by said reactive gas and the LASER beam is enveloped in the reactive gas and forming a relatively thick oxide layer for adsorbing and binding free ions at and in the vicinity of said at least one edge as a result of the reactive gas being in effective contact with the foil during creation of the at least one edge and providing an increase in the nominal field strength of capacitors made with said foil as a result of reducing the imbalance of field strength at the edge region of the foil by creating said at least one rounded edge having substantially no burrs and cracks.

2. Process according to claim 1 wherein said at least one edge is a cut edge.

3. Process according to claim 1 including forming a thicker aluminum oxide layer on said at least one edge than without said higher oxygen concentration with free ions accumulating thereon.

4. Process for forming a capacitor foil of aluminum or an aluminum alloy which comprises creating at least one rounded edge exhibiting substantially no burrs and cracks on said aluminum or aluminum alloy foil with a LASER beam enclosed in a reactive gas wherein said reactive gas is a gas mixture containing from about 45% to about 60% oxygen so that air in the immediate vicinity of the LASER beam is displaced by said reactive gas and the LASER beam is enveloped in the reactive gas and forming an oxide layer having a thickness of about at least 800Å for adsorbing and binding free ions at and in the vicinity of said at least one edge as a result of the reactive gas being in effective contact with the foil during creation of the at least one edge and providing an increase in the nominal field strength of capacitors made with said foil as a result of reducing the imbalance of field strength at the edge region of the foil by creating said at least one rounded edge having substantially no burrs and cracks.

5. Process according to claim 4 wherein said at least one edge is a cut edge.

6. Process for forming a capacitor foil of aluminum or an aluminum alloy which comprises creating at least one rounded edge exhibiting substantially no burrs and cracks on said aluminum or aluminum alloy foil with a LASER beam enclosed in a reactive gas wherein said reactive gas is a gas mixture containing a higher concentration of oxygen than the concentration of oxygen in air so that air in the immediate vicinity of the LASER beam is displaced by said reactive gas and the LASER beam is enveloped in the reactive gas and forming an oxide layer having a thickness of between 800Å and 1600Å for adsorbing and binding free ions at and in the vicinity of said at least one edge as a result of the reactive gas being effective contact with the foil during creation of the at least one edge and providing an increase in the nominal field strength of capacitors made with said foil as a result of reducing the imbalance of field strength at the edge region of the foil by creating said at least one rounded edge having substantially no burrs and cracks.

7. Process according to claim 6 wherein said at least one edge is a cut edge.

8. Process according to claim 6 wherein said at least one edge is created by a LASER beam enclosed in an atmosphere containing from about 45% to about 60% oxygen.

* * * * *

UNITED STATES PATENT AND TRADEMARK OFFICE
CERTIFICATE OF CORRECTION

PATENT NO. : 4,916,285
DATED : April 10, 1990
INVENTOR(S) : RUDOLF BAUR ET AL.

It is certified that error appears in the above-identified patent and that said Letters Patent is hereby corrected as shown below:

In Column 5, line 67, after "edge" delete "wa" and insert --was--.

In Column 7, claim 1, line 11, after "aluminum" insert --or an aluminum--.

In Column 8, claim 5, line 14, delete "at" and insert --is--.

Signed and Sealed this

Ninth Day of July, 1991

Attest:

HARRY F. MANBECK, JR.

*Attesting Officer*        *Commissioner of Patents and Trademarks*